United States Patent [19]

Scott

[11] 3,726,278

[45] Apr. 10, 1973

[54] DOCKING DEVICE FOR YOUNG ANIMALS

[76] Inventor: Fred W. Scott, R.D. No. 3, Bellville, Ohio

[22] Filed: Mar. 26, 1971

[21] Appl. No.: 128,265

[52] U.S. Cl. .................................. 128/303 A, 40/304
[51] Int. Cl. .............................................. A61b 17/00
[58] Field of Search ............................... 40/300, 304; 128/303 A, 303 R, 326

[56] References Cited

UNITED STATES PATENTS

| 2,619,964 | 12/1952 | Thaete | 128/303 R |
| 2,764,160 | 9/1956 | Alexander et al. | 128/303 R |

Primary Examiner—Aldrich F. Medbery
Attorney—Berman, Davidson and Berman

[57] ABSTRACT

A device for expanding elastic rings so that they can be transferred to an appendage of an animal for ultimate removal of the appendage. The device consists of an originally cylindrical tube which is adapted to fit over the appendage. The forward portion of the tube is cut away to define a tapered front point and side walls having upwardly and rearwardly inclined upwardly concave top edges leading to the cylindrical rear end portion of the tube to facilitate the mounting of the elastic rings on the rear end of the tube, from which they can be rolled off to embrace the appendage to be removed.

2 Claims, 3 Drawing Figures

PATENTED APR 10 1973

3,726,278

INVENTOR
FRED W. SCOTT,
BY
Berman, Davidson & Berman,
ATTORNEYS.

DOCKING DEVICE FOR YOUNG ANIMALS

This invention relates to devices for removing appendages from animals, for example, for use in castrating animals such as bull calves, sheep and goats by the knifeless operation known as the "sloughing off" process, and more particularly to an apparatus for facilitating the application of elastic rings applied to the appendage to be removed.

A main object of the invention is to provide a novel and improved device for applying elastic rings to appendages of animals, for the purpose of castrating the animals or for removing the appendages, by the sloughing off process, the device being simple in construction, being easy to use, and being particularly constructed so as to make it easy to apply the elastic rings intended to be engaged around the appendages to be removed.

A further object of the invention is to provide an improved device for applying elastic rings intended for use in castrating young animals or for removing appendages therefrom, the device being inexpensive to fabricate, being durable in construction, being easy to apply, and enabling the desired operation to be performed in a short time and with minimum effort.

Further objects and advantages of the invention will become apparent from the following description and claims, and from the accompanying drawing, wherein:

Figure 1:
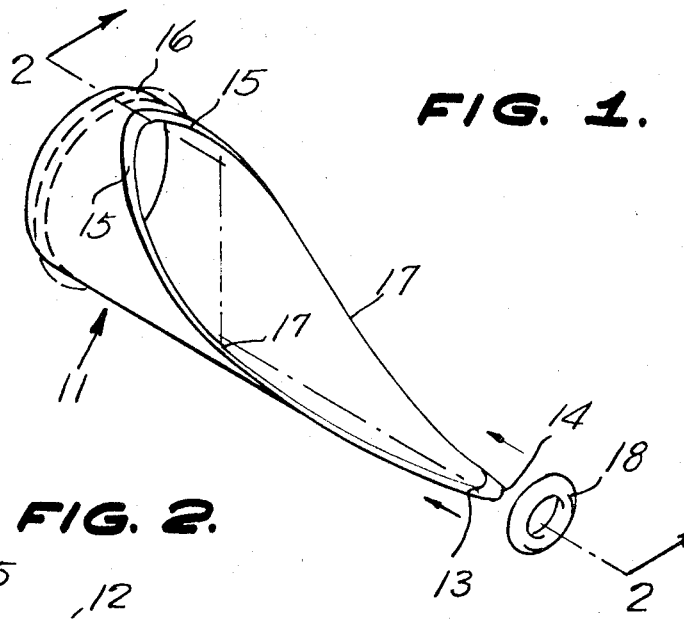
FIG. 1 is a perspective view of an improved device for applying elastic rings to an appendage to be removed, constructed in accordance with the present invention, showing a typical elastic ring in a position to be engaged with the device.

There has recently been developed an important method of castrating bulls, sheep, goats and similar animals and for the docking of lamb's tails, involving applying rubber rings to the scrotum or on the tail in such a manner that the blood supply to the appendage is restricted, thereby ultimately producing atrophy and subsequent sloughing. In carrying out this process, the rubber rings are expanded to permit introduction of the appendage, after which the rings are allowed to contract and remain in a predetermined position on the appendage. This method of castration and docking has considerable advantages over the use of cutting instruments, previously employed for castrating or tail docking, in that there is no loss of blood, and the dangers of infection or shock to the animal are minimized.

The main purpose of the present invention is to provide a simple and efficient device to facilitate the mounting of the elastic rings in their intended position, namely, to facilitate the expansion of the rings around the appendages to be removed and the release of the rings on to the appendages at the precise intended locations on the appendages. Thus, the device of the present invention comprises a tool employed to efficiently administer a constricting band to the tail or scrotum of an animal.

Referring to the drawings, 11 generally designates an improved band-mounting tool constructed in accordance with the present invention. The tool 11 comprises a rigid, originally cylindrical tube of sufficient diameter to receive the appendage to be removed, for example, to receive a lamb's tail 12, shown in dotted view in FIG. 2. The cylindrical tube is cut away to define a tapered front point 13, which is preferably rounded off at its tip, as shown at 14. The cutting of the cylindrical tube is in a generally sinuous fashion, as will be clearly apparent from FiG. 2, so that the cut slopes gradually downwardly and to the right toward the tip 14, as viewed in FIG. 2, defining side walls tapering to the right which have upwardly concave edges along their main length and which gradually reverse their curvature at their shoulder portions 15 so as to smoothly merge with the short cylindrical rear portion 16 of the tool. Thus, the upwardly concave edges, shown at 17, are fairly long and extend for the major portion of the total length of the tool, so that they provide a means for gradually expanding an elastic ring 18 forced thereon leftwards, as viewed in FIG. 2.

Thus, in a typical embodiment of the device, the total length of the tool was 4½ inches with a diameter of approximately 1⅝ inches, and the rear cylindrical portion 16 had a length of approximately one-half inch. Thus, the sinuous tapering edges 15, 17 extended for a length of approximately 4 inches, with the convex shoulder portions 15 extending over approximately one-half inch of length adjacent the upper ends of the concave edge portions 17.

Figure 2:
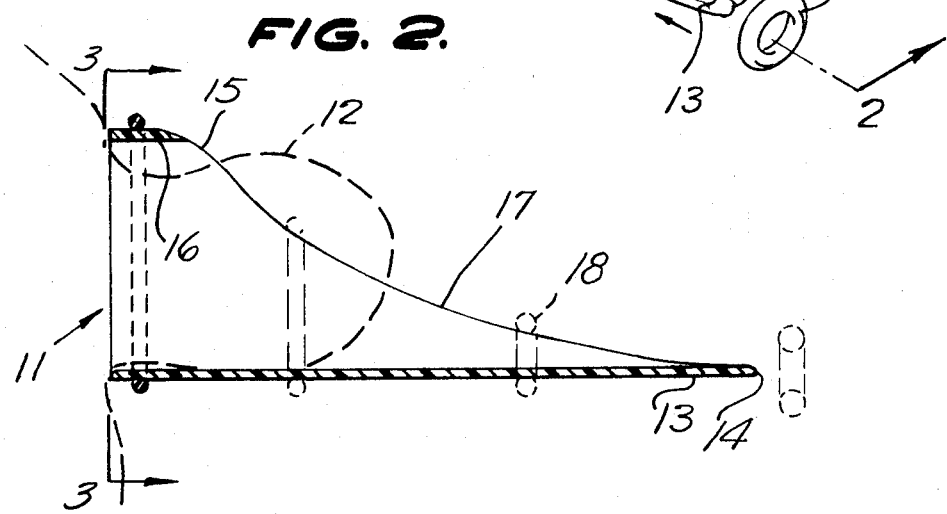
FIG. 2 is a somewhat enlarged vertical cross-sectional view taken substantially on the line 2—2 of FIG. 1 and illustrating the manner in which the elastic ring is moved on to the rear cylindrical portion of the device in gradual stages.
Figure 3:
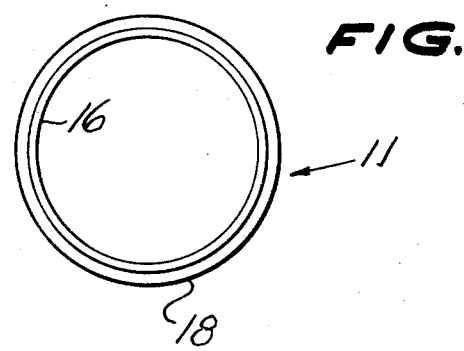
FIG. 3 is an elevational view taken substantially on the line 3—3 of FIG. 2.

In using the tool, an elastic band 18, which is initially relatively small in diameter, as shown in FIG. 1, is engaged on the front portion 13 of the tool and is moved rearwardly along the tapered portion thereof, namely, along the concave edges 17 and is forced to expand until finally at the end of its leftward movement, as viewed in FIG. 2, the ring is positioned on the cylindrical rear end portion 16 of the tool. The cylindrical rear end portion of the tube is then inserted over the tail or scrotum of the animal, for example, over the lamb's tail 12 shown in FIG. 2, with the cylindrical portion of the tube held fairly close to the animal's body. The band 18 is then released by rolling it leftwards off the cylindrical portion 16 of the tube so that it contracts around the base portion of the appendage 12, and is left thereon whereby it ultimately causes atrophy and subsequent sloughing of the appendage.

It will be readily apparent that the concave edges 17 greatly facilitate the mounting of the ring 18 since they allow the ring to be gradually expanded without damage thereto and to be moved ultimately on to the cylindrical rear end portion 16 of the tool in a smooth and efficient manner and without the necessity of exerting excessive force on the ring. Thus, the ring can be slid smoothly leftwards, as viewed in FIG. 2, causing it to gradually expand, and when in its position of almost maximum tension can be smoothly rolled over the convex short shoulder portions 15 and rolled on to the cylindrical ring portion 16. Since the portion 16 has a smooth surface, the expanded ring 18 can thereafter be readily rolled off on to the base of the appendage 12 of the animal.

While a specific embodiment of an improved device for expanding elastic rings so that they can be transferred to an appendage of an animal has been disclosed in the foregoing description, it will be understood that various modifications within the spirit of the invention may occur to those skilled in the art. Therefore, it is intended that no limitations be placed on the invention except as defined by the scope of the appended claims.

what is claimed is:

1. An animal docking tool comprising a one-piece, hollow, rigid, cylindrical tube open at both ends having a short rear end portion and a tapered forward end portion of substantial length integral with and merging with said ring portion, said rear end portion having cross-sections which are complete circles for receiving an expanded elastic docking ring, said tapered forward portion being formed by omission of part of the wall of said tube so that successive cross-sections in the rearward direction are gradually increasing segments of a circle and the wall of the tube presents upper edges which are inclined upwardly and rearwardly from a forward tip toward said rear end ring portion for receiving non-expanded elastic docking rings for movement therealong to expand the same, said upper edges defining curves which are upwardly concave for the major portions of their lengths and becoming upwardly convex adjacent said rear end ring portion.

2. The docking tool of claim 1, wherein said tip of the tapered forward end portion is rounded, and said upper edges of the forward portion are smoothly curved.

* * * * *